United States Patent
Bell

(10) Patent No.: US 7,069,328 B1
(45) Date of Patent: Jun. 27, 2006

(54) SYSTEM AND METHOD TO INTERFACE A LOCAL AREA NETWORK WITH A WIDE AREA NETWORK

(75) Inventor: Russell W. Bell, Wall, NJ (US)

(73) Assignee: Conexant, Inc., Red Bank, NJ (US)

(*) Notice: Subject to any disclaimer, the term of this patent is extended or adjusted under 35 U.S.C. 154(b) by 691 days.

(21) Appl. No.: 09/579,309

(22) Filed: May 25, 2000

Related U.S. Application Data

(60) Provisional application No. 60/135,987, filed on May 25, 1999.

(51) Int. Cl.
*G06F 15/16* (2006.01)
(52) U.S. Cl. .................... 709/227; 709/238; 370/395.3
(58) Field of Classification Search ................ 709/289, 709/250, 227–229, 238; 370/402, 466, 468, 370/352, 395.3, 401
See application file for complete search history.

(56) References Cited

U.S. PATENT DOCUMENTS

| | | | | |
|---|---|---|---|---|
| 5,588,003 A | * | 12/1996 | Ohba et al. | 370/468 |
| 5,802,285 A | * | 9/1998 | Hirviniemi | 709/250 |
| 6,154,465 A | * | 11/2000 | Pickett | 370/466 |
| 6,185,215 B1 | * | 2/2001 | Aho | 370/402 |
| 6,252,878 B1 | * | 6/2001 | Locklear et al. | 370/401 |
| 6,282,660 B1 | * | 8/2001 | Anne et al. | 713/300 |
| 6,356,554 B1 | * | 3/2002 | Pickett et al. | 370/402 |
| 6,370,656 B1 | * | 4/2002 | Olarig et al. | 714/23 |

* cited by examiner

*Primary Examiner*—William C. Vaughn, Jr.
*Assistant Examiner*—Phuoc Nguyen
(74) *Attorney, Agent, or Firm*—Thomas, Kayden, Horstemeyer & Risley

(57) ABSTRACT

A system that provides a multi-drop local area network (LAN) data transfer with devices on a wide area network (WAN) via a communication network is disclosed. Two methods for managing data traffic flow between individual nodes on a LAN and a WAN are also disclosed. The point to multi-point communication system may be implemented with a digital subscriber line (DSL) transceiver and compatibly configured communication devices coupled with each node or computer on a LAN. In one embodiment, the system uses a master computer on the LAN to manage protocol stacks to control the flow of downstream and upstream data traffic between computers on the LAN and WAN data traffic on a DSL. In a second embodiment, the master computer assigns at least one asynchronous transfer mode (ATM) level virtual connection (VC) to each computer on the LAN. Each computer on the LAN identifies data traffic designated to be sent to that particular computer, removes the data from the network, and notifies the master computer that the data traffic has been received. In the second embodiment, upstream data traffic is forwarded to the master computer, which maps the appropriate ATM VC identifier before forwarding the data to the DSL transceiver for transmission. Further alternative embodiments can use a community access television (CATV) network and a wireless network to bridge the LAN and the WAN.

33 Claims, 11 Drawing Sheets

SYSTEM AND METHOD TO INTERFACE A LOCAL AREA NETWORK WITH A WIDE AREA NETWORK

CROSS-REFERENCE TO RELATED APPLICATIONS

The present application claims the benefit of U.S. Provisional Patent Application, assigned Ser. No. 60/135,987, filed May 25, 1999, now abandoned, entitled, "VC Spoofing," which is hereby incorporated by reference in its entirety.

BACKGROUND OF THE INVENTION

1. Field of the Invention

The present invention generally relates to high speed data communications wherein signal information is processed both in digital and analog forms. More specifically, the invention relates to a system and method that uses a single digital subscriber line (DSL) transmission unit within an end office of the public switched telephone network (PSTN) to establish high speed communication links with multiple users in a multi-drop network.

2. Discussion of the Related Art

In recent years, telephone communication systems have expanded from traditional plain old telephone system (POTS) communications to include high-speed data communications as well. As is known, POTS communications include the transmission of voice information, control signals, public switched telephone network (PSTN) information, as well as, information from ancillary equipment in analog form (i.e. computer modems and facsimile machines) that is transmitted in the POTS bandwidth.

Prompted largely by the desire of large businesses to reliably transfer information over a broadband network, telecommunications service providers have employed digital subscriber lines (DSL) to provide a plethora of interactive multi-media digital signals over the same existing POTS twisted-pair lines. The provision of DSL services to customer premise has proliferated over recent years as the small office, home office (SOHO) market desires to take advantage of the increased bandwidth and data transfer rates provided by DSL. DSL services are typically provided to remotely located customer premise by equipping both the appropriate central office and the customer premise with compatible DSL modems.

DSL modems communicate by modulating a baseband signal with customer desired service signals, converting the modulated digital data signal to an analog signal, and transmitting the analog signal over the conventional copper wire pair provided in the PSTN from a central office to a customer premise via a carrier service area (CSA) loop. Well known data modulation and transmission techniques include mapping digital data to be transmitted into a multi-dimensional multi-level signal space constellation and decoding the received constellation to recover the transmitted information.

As various DSL standards evolved, it became clear that it would be highly desirable to deliver a high-speed DSL service that is as easy to operate and use as a dial-up modem, thus leading to the concept of DSL-Lite. DSL-Lite or G.Lite includes provisions for connecting a DSL line without the need for splitters at the customer premise equipment-end (CPE) of the network. During standards development, it was observed that there are over 15 million households in the United States that have two or more PCs. As a result, equipment manufacturers began to address the SOHO networking market by introducing a variety of traditional products including routers, bridges, etc., which required additional premise wiring and user expertise in network configuration, maintenance, and troubleshooting.

On a local area network (LAN), a media access control (MAC) or address is required to properly direct information to each of the individual computers or nodes on the LAN. On a LAN, a MAC address is a computer's unique address and may be in a "hard-wired" form. On an Ethernet LAN, it is the same as the computer's Ethernet address. When connected to the Internet, a connection table maps the Internet protocol (IP) address to each computer's physical address on the LAN. As currently defined, DSL standards do not provide a MAC capable of operating in a multi-point environment as there are no MAC addresses in DSL.

Another way of stating the problem is that in the downstream direction, the central office (CO) digital subscriber line access multiplexer (DSLAM) has no mechanism for differentiating between two or more network devices in a multi-drop environment, as DSL does not provide for auto-configuration of multiple IP addresses in a multi-point configuration. Similarly, in the upstream direction, there is no way for multiple devices to gain access to the upstream channel. As a direct result, DSL applications have been limited to operating as point-to-point communications links.

SUMMARY OF THE INVENTION

In light of the foregoing, the invention is a system and method that provides multi-point access to DSL services via a single DSL supplied to a customer premise.

In accordance with one embodiment of the present invention, a system and method is provided that uses a master node or computer to manage communications at the customer premise. In this embodiment, communications between non-master nodes and the central office (CO) DSLAM are assigned appropriate virtual channels (VCs) for identifying each of the devices at the CPE-end of the DSL. Local traffic between each of the nodes on the local network is not required to pass through the master node and may proceed by using any of a number of known techniques in conjunction with appropriate MAC layer technology.

In accordance with a second embodiment consistent with the present invention, a master node establishes a plurality of connections to the CO-DSLAM by generating and assigning asynchronous transfer mode (ATM) layer VCs for each node on the LAN. The master node informs the local node of the ATM VC identifier and maps local network traffic designated for the CO/ISP onto the DSL upstream at the ATM layer. Downstream DSL traffic is sent to all nodes on the LAN. The appropriate node or nodes will recognize the ATM layer VC, remove the appropriate data or traffic, and inform the master node that the traffic has been removed. This second embodiment permits traffic with the correct VC to pass through the local network without intervention by the master PC. Thus improving the overall throughput and performance of the network.

Other objects, features, and advantages of the present invention will become apparent to one skilled in the art upon examination of the following drawings and detailed description. It is intended that all such additional objects, features, and advantages be included herein within the scope of the present invention, as defined by the claims.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENTS

Figure 1:
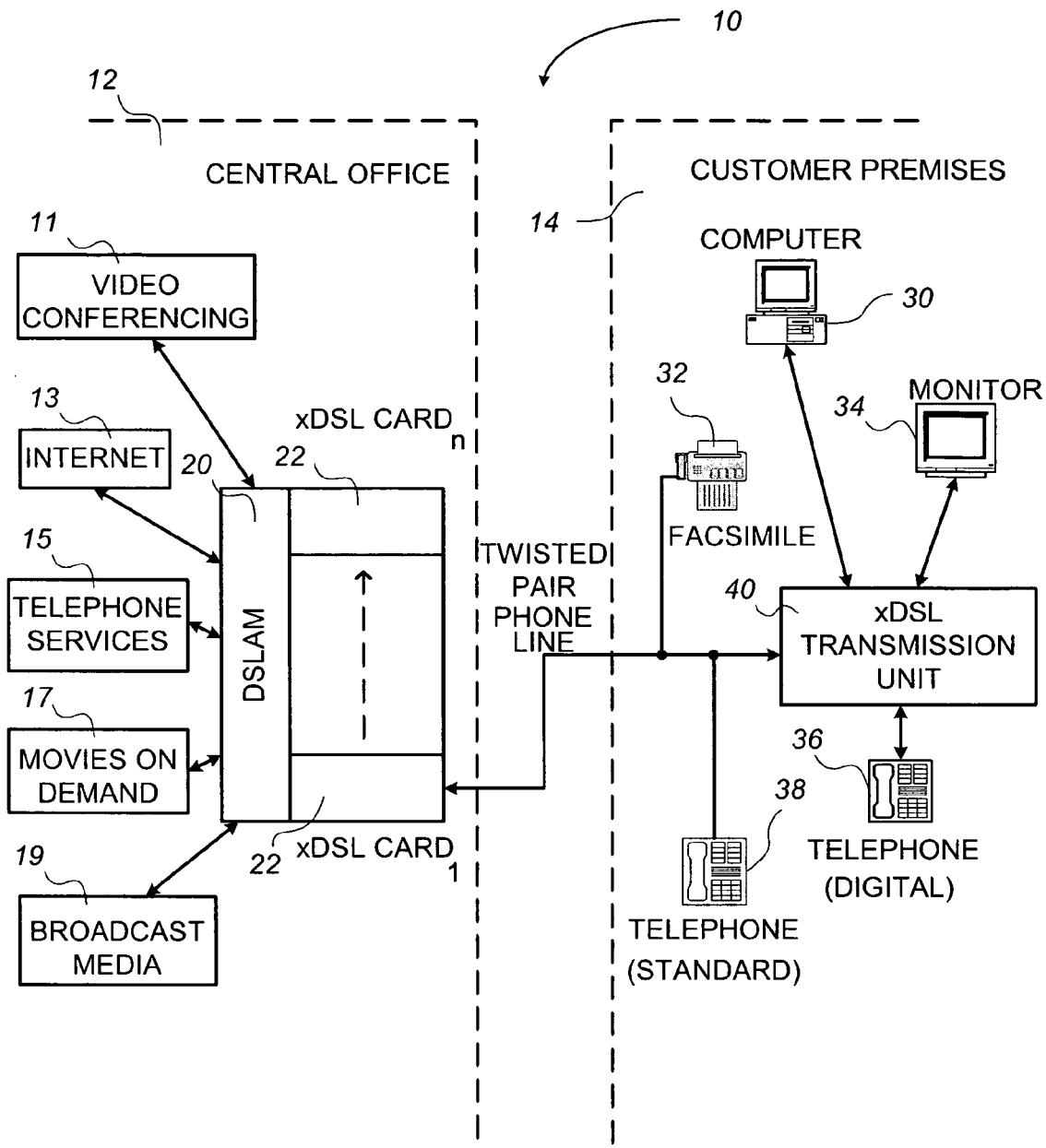
FIG. 1 is a prior art block diagram illustrating the delivery of multiple broadband services via a xDSL communications system over the PSTN.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims. Turning now to the drawings, wherein like referenced numerals designate corresponding parts throughout the drawings, reference is made to FIG. 1, which illustrates the delivery of broadband communication services via a xDSL communications system 10 over the POTS network. In this regard, a central office 12 is configured to receive broadband services, which it assembles via central office xDSL card(s) 22, illustrated as xDSL card$_1$, through xDSL card$_n$, for transmission over a POTS twisted-pair phone line to a customer premise 14. Examples of such broadband services are depicted as, but not limited to, video conferencing 11, Internet 13, telephone services 15, movies on demand 17, and broadcast media 19. Central office 12 assembles signals from the aforementioned broadband services via a digital subscriber line access multiplexer (DSLAM) 20 for appropriate transformation and transmission by xDSL cards 22 to multiple customer premises 14 (one shown). In xDSL implementations, one xDSL line card 22 is dedicated to providing the multiple xDSL services to a single customer premise 14.

Customer premise 14 is provided a compatible xDSL transmission unit 40, which processes and distributes the several xDSL services to appropriate destination devices such as, but not limited to, a computer 30, a monitor 34, and a digital telephone 36 as illustrated. In addition, the customer premises 14 may have POTS devices such as, but not limited to, a facsimile machine 32 and a standard telephone 38 integrated on the PSTN twisted pair phone line along with xDSL transmission unit 40. It should be understood that the circuitry conventionally implemented in, for example, a xDSL transceiver will be included within the xDSL cards 22 and the xDSL transmission unit 40 as shown in FIG. 1. The implementation of such circuitry will be appreciated by persons skilled in the art, and need not be described herein.

Figure 2:
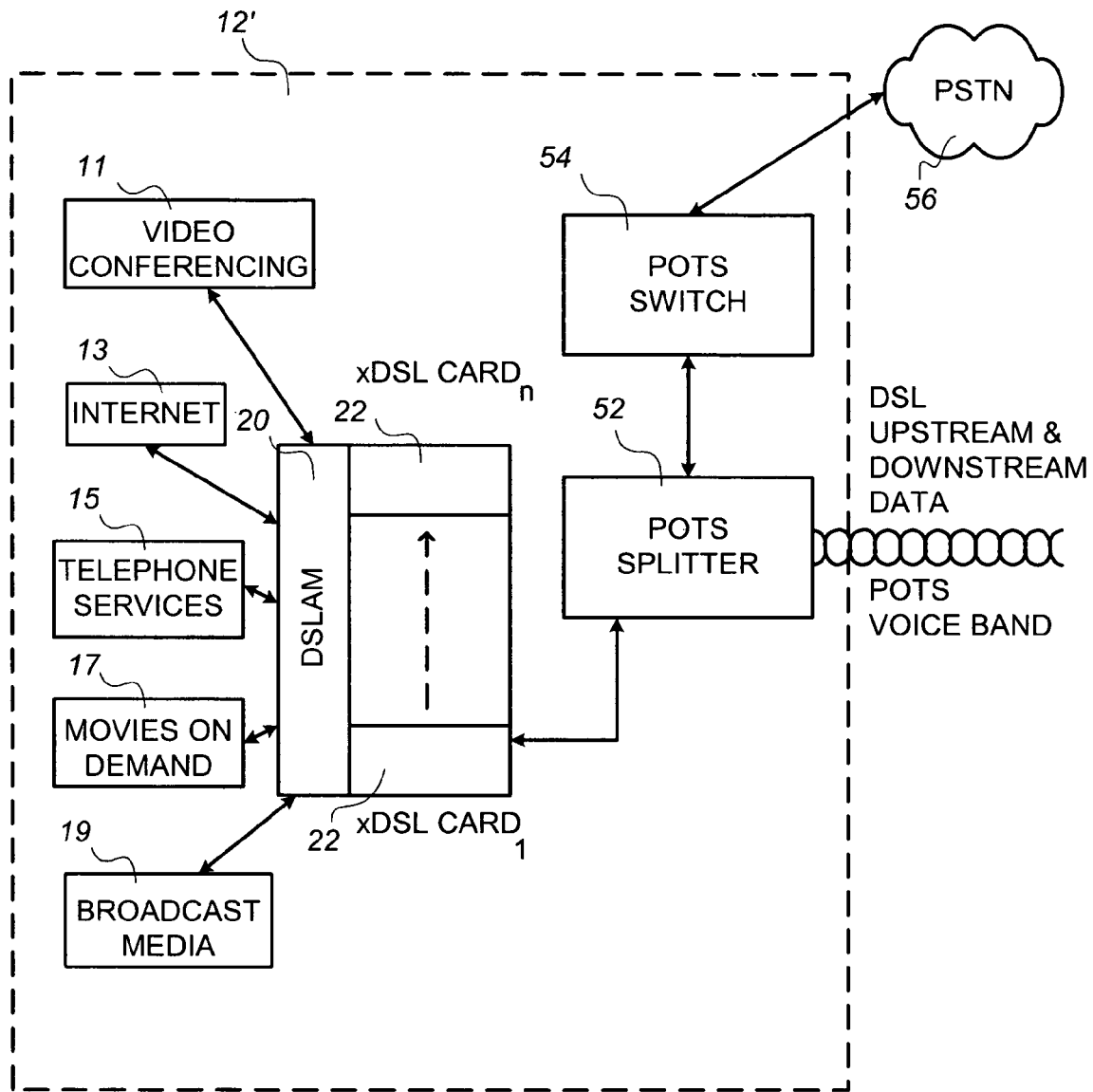
FIG. 2 is a prior art block diagram further illustrating hardware that may be used at a central office in the communications system of FIG. 1.

Having provided a top level description of a xDSL communications system 10 configured to deliver a multitude of broadband services, reference is now made to FIG. 2, which further illustrates the integration of xDSL equipment in the central office 12' introduced in FIG. 1. In this regard, the central office 12' may also be outfitted with a POTS splitter 52 and a POTS switch 54 to permit integration with a PSTN 56. The POTS splitter 52 receives a voice channel from the POTS switch 54, as well as, a composite analog signal from xDSL card 22 and combines the two signals for transmission to a customer premise 14 (not shown) over the PSTN twisted pair telephone line (see FIG. 1). As further illustrated in FIG. 2, both the POTS voice band signal and the upstream (from the customer premise 14 to the central office 12') and the downstream (from the central office 12' to the customer premise 14) DSL data channels are combined and transmitted/received along the PSTN twisted pair telephone line.

The POTS switch 54 is responsible for successfully routing and completing both incoming and outgoing voice band calls from the PSTN 56 as is well known and understood by those skilled in the art. The POTS splitter 52 separates the 300 Hz to 3,500 Hz voice channel from the upstream and downstream DSL data channels. In the voice passband, the POTS splitter 52 should pass not only voice frequency signals with little distortion, but also dial tone, ringing, and on/off hook signals. For the voice frequency signal, the POTS splitter 52 should maintain the original POTS impedance and return loss requirements. Otherwise, POTS automatic network test systems would have difficulty troubleshooting telephone subscriber loop and residential equipment problems. The POTS splitter 52 interface also needs to pass high voltage and high current signals for ringing, on/off hook and so forth.

The POTS splitter 52 consists of mainly a low pass filter for the POTS interface and a high pass filter for the upstream and downstream DSL channels. The low pass filter removes the interference from the upstream and downstream DSL channels from the POTS voice channel. The POTS voice channel impedance should not be affected by the impedance of the upstream and downstream DSL channels. The high pass filter removes the interference from the POTS signals to the upstream and downstream DSL channels. The harmonics of ringing and on/off hook signals are thereby prevented from entering the upstream and downstream DSL channels.

As previously described in relation to the FIG. 1, broadband data services such as, but not limited to, video conferencing 11, Internet 13, telephone services 15, movies on demand 17, and broadcast media 19 may be assembled in the DSLAM 20 and further processed in xDSL card(s) 22 to permit analog transmission over the PSTN twisted pair phone line.

Figure 3:
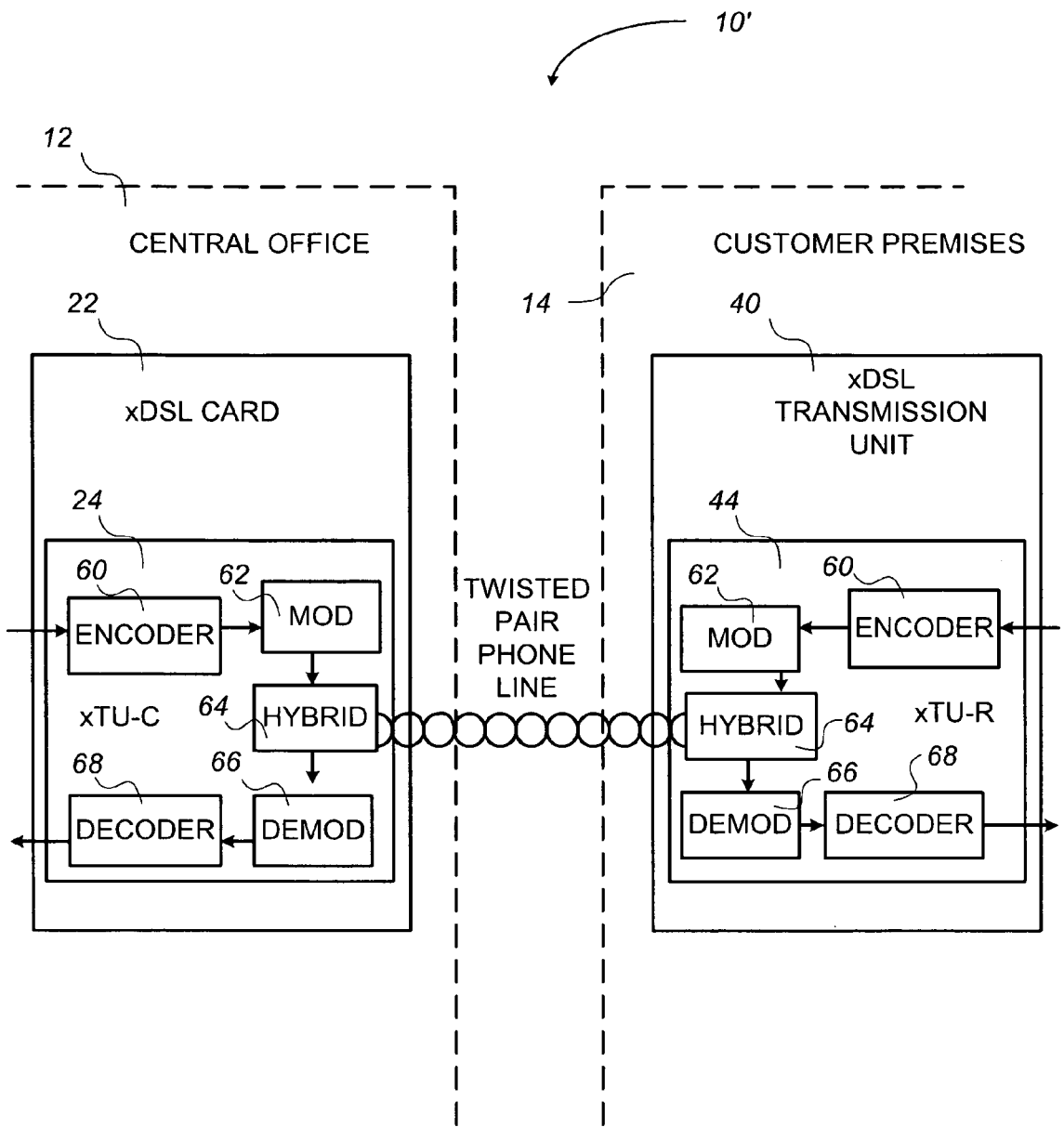
FIG. 3 is a prior art block diagram further illustrating hardware that may be used to complete the xDSL portion of the communications system of FIG. 1.

Having further described the operation of central office 12' equipment in a joint POTS/DSL communications system with regard to FIG. 2, reference is now directed to FIG. 3. In this regard, FIG. 3 further illustrates the functional components in the DSL portion of the joint POTS/DSL communication system introduced in FIG. 1.

FIG. 3 focuses on the functions necessary to implement a xDSL communications link capable of transmitting and receiving the upstream and downstream channels. As illustrated in FIG. 3, central office 12 may be configured with a xDSL card 22. Each of the xDSL cards 22 first illustrated in FIG. 1 may be configured to supply power and a digital data stream comprising the one or more DSL services designated for transmission to a xDSL modem unit—central office, hereinafter xTU-C 24. For simplicity of description, FIG. 3 illustrates a single xDSL communication link between a xDSL card 22 within a central office 12 and a single xDSL transmission unit 40 at a customer premise 14.

Similarly, xDSL transmission unit 40 located at the customer premise 14 contains a xDSL transmission unit-remote, hereinafter xTU-R 44. Both xTU-C 24 and xTU-R 44 serve to enable two-way communications between the xDSL card 22 and the xDSL transmission unit 40 via the PSTN twisted pair phone line. Since each xTU is similarly configured, the description herein will address the five functional blocks only once. Both xTU-C 24 and xTU-R 44 receive digital data in encoder 60. The xTU-C 24 receives data from the one or more broadband data services previously described in relation to FIGS. 1 and 2. The xTU-R 44 receives customer initiated data from the one or more destination devices as previously described with regards to FIGS. 1 and 2. Upstream data, by way of example, may include, but is not limited to, a movie selection and customer identification information, video, voice, or data related to an Internet application. Regardless of the source, the encoder 60 processes the digital data and forwards it to modulator 62, which adaptively applies the digital data via any of a number of known modulated schemes. The modulator 62 then forwards the encoded and modulated digital data stream to hybrid 64 for digital to analog conversion and transmission along the PSTN twisted pair phone line. In the manner described above, data is assembled, adaptively applied, and transmitted from one xDSL device to another across the PSTN twisted pair phone lines.

Similarly, hybrid 64 is configured to receive an analog signal that may contain a number of encoded and modulated data channels. In the case of the xTU-C 24 within the central office 12, hybrid 64 will receive upstream data from the remote xTU-R 44 along the PSTN line. In the case of the xTU-R 44 within the customer premise 14, hybrid 64 receives the downstream data comprising information from the one or more broadband data services. In either case, hybrid 64 receives the analog representation of the plurality of data channels, converts the analog signal into a digital data stream, and forwards the data stream to demodulator 66. The demodulator 66 processes the digital data stream to recover each of the encoded upstream channels. The demodulator 66 forwards the digital data to decoder 68, which further processes the upstream digital data stream and distributes it to the appropriate broadband destination device.

Reference Model for Open Systems Interconnection

Figure 4A:
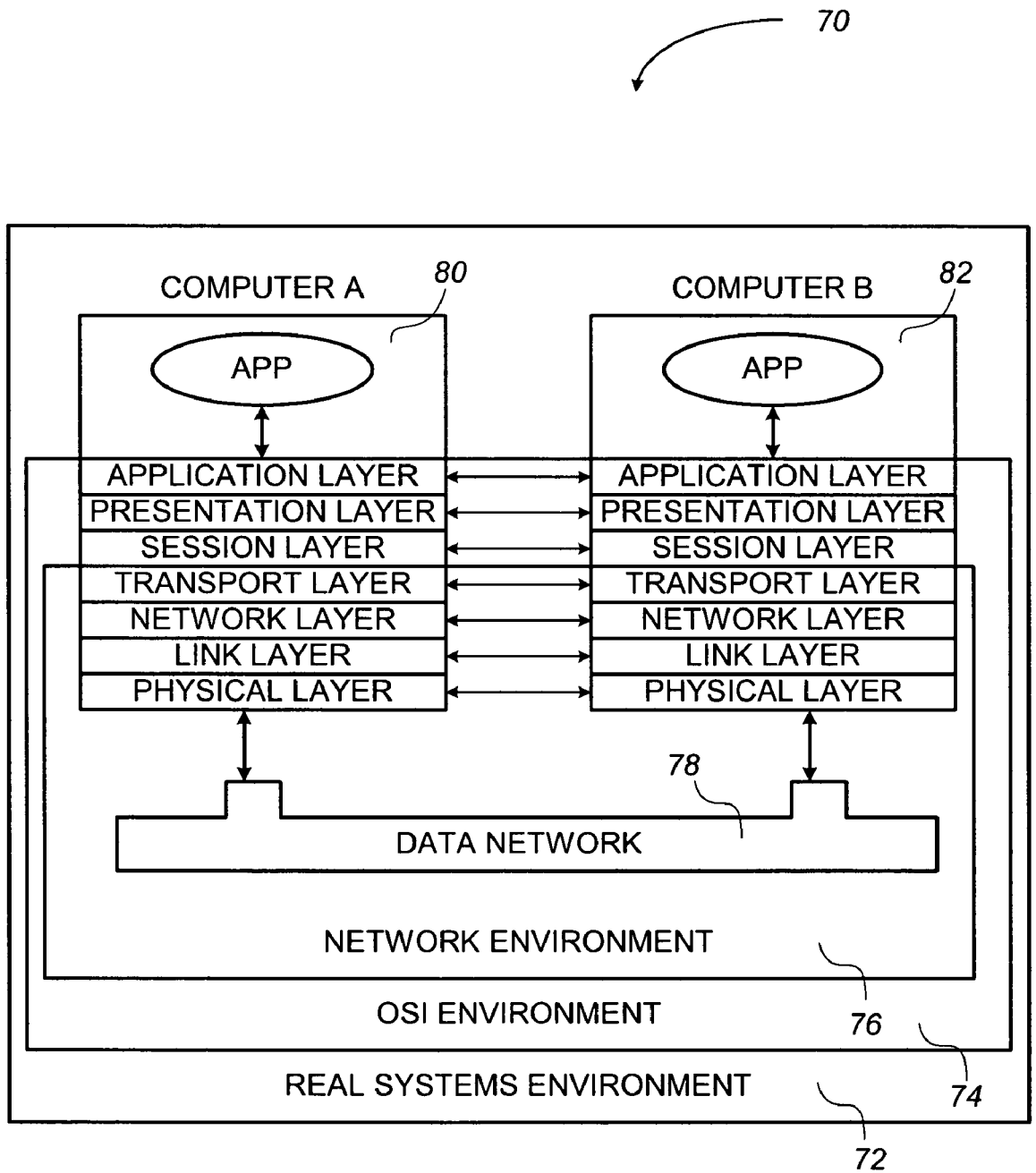
FIG. 4A is a diagram illustrating the operational environments in the International Standards Organization reference model for open systems interconnection (OSI)

Having described both the upstream and downstream processing paths through both the xTU-C 24 located within a central office 12 and the xTU-R 44 located within the customer premise 14 with regard to FIG. 3, reference is now directed to FIG. 4A. In this regard, FIG. 4A is a diagram illustrating the operational environments in the International Standards Organization (ISO) reference model for open systems interconnection (OSI).

As illustrated in the ISO reference model for OSI shown in FIG. 4A, a network communication link 70 may be established between a first computer, designated computer A 80 and a second computer, designated computer B 82 when the computers A, B 80, 82 are coupled to a data network 78. A communication system may comprise a complex configuration of both hardware and software. Early attempts at implementing software for such systems were often based on a single, complex, and unstructured program with many interacting components. The resulting software was difficult to test, troubleshoot, and modify.

To overcome these problems, the ISO adopted a layered approach in creating a reference model for data communications systems. The complex communication system is broken down into multiple layers, each of which performs a well-defined function. Conceptually, the layers can be considered as performing one of two generic functions, either network-dependent functions or application-oriented functions. The functional breakdown defining network functions and application-oriented functions gives rise to three distinct operational environments: the network environment 76, the OSI environment 74, and the real-systems environment 72.

The network environment 76 is concerned with the protocols and standards relating to the different types of underlying data communication networks. The OSI environment 74 encompasses the network environment 76 and adds additional application oriented protocols and standards to allow end systems (computers) to communicate with one another. The real-systems environment 72 builds on the OSI environment 74 and is concerned with an individual manufacturer's proprietary software and services developed to perform a particular distributed information processing task.

As further illustrated in FIG. 4A, both the network-dependent and the application-oriented components of the OSI model are operative within computers A, B 80, 82 and are represented as a number of layers. Each layer performs a well-defined function in the context of the overall communication system 70. Each layer operates according to a defined protocol by exchanging messages, both user data and additional control information, with a corresponding peer layer in a remote system. This concept is illustrated in FIG. 4A by way of the two-headed arrows between each of the layers. Each layer has a defined interface between itself and the adjacent layers both above and below. Consequently, the implementation of a particular protocol layer is independent of all other layers.

As shown in FIG. 4A, the logical structure of the ISO reference model is made up of seven protocol layers. The three lowest layers, the network layer, the link layer, and the physical layer, are network dependent and are concerned with the protocols associated with the data communication network being used to link the computers A, B 80, 82. In contrast, the three upper layers, the application layer, the presentation layer, and the session layer, are application-oriented and are concerned with the protocols that allow two end-user application processes (computer programs) to interact with each other. The intermediate transport layer, masks the upper level application-oriented layers from the details of the lower network-dependent layers. Essentially, the transport layer builds on services provided by the network-dependent layers to provide the application-oriented layers with a network independent message interchange service.

Figure 4B:
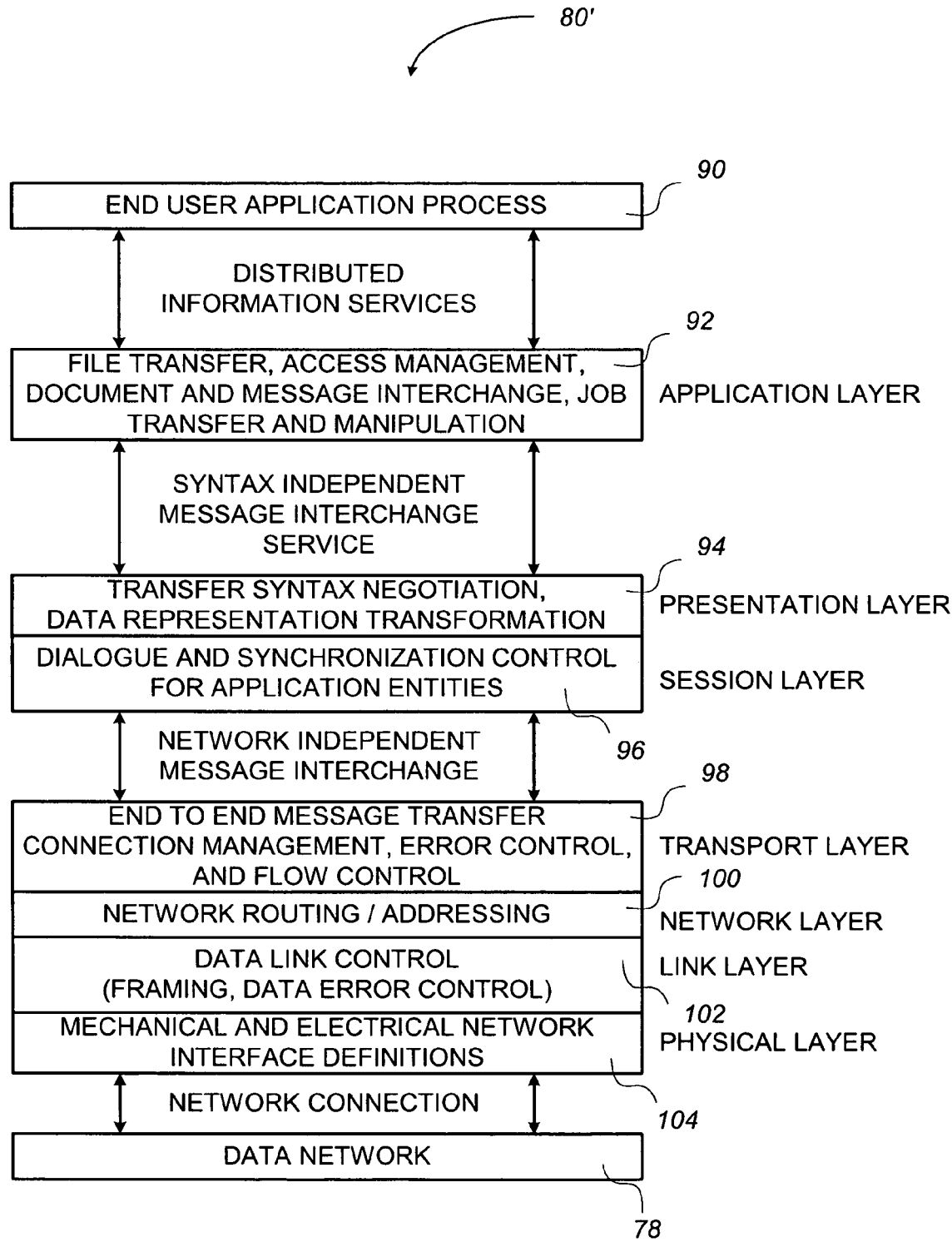
FIG. 4B further illustrates the protocol layers between the data network and computer A illustrated in FIG. 4A.

Having described the ISO reference model for OSI with regard to FIG. 4A, reference is now directed to FIG. 4B. In this regard, FIG. 4B further illustrates the functionality imbedded within the seven layers between the computer A 80 and the data network 78 introduced in FIG. 4A.

As illustrated in FIG. 4B, the protocol layers within computer A 80' are as follows: the application layer 92, the presentation layer 94, the session layer 96, the transport layer 98, the network layer 100, the link layer 102, and the physical layer 104. The function of each of the seven layers introduced with regard to the reference model for OSI in FIG. 4A is specified formally as a protocol that defines the set of rules and conventions used by each layer to communicate with a peer layer in a remote computer. Each layer provides a set of services to the layer immediately above. It also uses the services provided by the layer immediately below to transport the message units associated with the protocol to the remote peer layer. As by way of example, the transport layer 98 provides a network-independent message transport service to the session layer 96 above it and uses the service provided by the network layer 100 below it, to transfer the set of message units associated with the transport protocol to a transport layer 98 located in a remote computer B (not shown).

Application-Oriented Layers

The Application Layer

The application layer 92 provides the user interface between an end-user application process 90 (usually a computer program) and a range of networking distributed information services as illustrated in FIG. 4B. Such services may take the form of file transfer, access, and management, as well as, general document and message interchange services such as electronic mail.

Access to application services is normally achieved through a defined set of primitives, each with associated parameters, which are supported by the local operating system. The access primitives function similarly to other well-known operating system calls and result in an appropriate operating system procedure being activated. These operating system calls use the communication system (software and hardware) as if it were a local device within its own computer, such as a hard disk drive controller. The detailed operation of the communication system below is transparent to the computer user and to the application layer 92 as well. When the application process is performed, one or more parameters are returned indicating the status of the process attempted (success or otherwise). In addition to information transfer, the application layer 92 provides such services as: identification of one or more intended destination devices; determination of the availability of the one or more destination devices; establishment of authority to communicate; agreement on privacy (encryption techniques) mechanisms; authentication of the intended on or more destination devices; selection of a dialogue discipline; agreement on the responsibility for error recovery; and identification on constraints for data syntax. For simplicity of illustration, the aforementioned application layer 92 functions are designated file transfer, access management, document and message interchange, job transfer and manipulation (see FIG. 4B).

The Presentation Layer

The presentation layer 94 is concerned with the syntax of data during data transfer between communicating end-user application processes 90. To achieve a true OSI, a number of abstract data syntax forms have been defined for use by end-user application processes 90 together with associated transfer syntaxes. The presentation layer 94 negotiates and selects an appropriate transfer syntax to be used during the course of a particular transaction to maintain data integrity between the two end-user application processes 90.

To illustrate the services performed by the presentation layer, consider a telephone conversation between individuals that speak separate and distinct languages. Assume that each speaker uses an interpreter and that the only common language between the interpreters is English. In order to facilitate communication, each interpreter must translate from their local language to English and vice versa. The two speakers are analogous to two end-user application processes 90 with the two interpreters representing the presentation layer. Both local syntaxes (the local languages), as well as, a common syntax (English) are used by the parties to communicate. It is important to note that there must be a universally understood language, which must be defined and used by the interpreters in order for the speakers to communicate.

Another function of the presentation layer 94 is concerned with data security. In some applications, data sent by an end-user application process 90 is first encrypted using a key, which is known by the intended recipient of the data. The recipient decrypts any received data using the key before passing the data to the destination end-user application process 90.

The Session Layer

The session layer 96 provides a means to enable two application layer protocol entities to organize and synchronize their dialogue and manage the data exchange. It is thus responsible for setting up and clearing a communication channel between two communicating application layer protocol entities (actually presentation layer protocol entities) as illustrated in FIG. 4B.

A number of optional services are provided, including the following: interaction management (duplex/half-duplex); synchronization, for managing data transfers when a data fault is encountered; and exception reporting when an unrecoverable fault is encountered during a data transfer.

Interface Between the Application-Oriented Layers and the Network-Dependent Layers The Transport Layer The transport layer 98 provides an interface between the higher application-oriented layers and the underlying network-dependent layers. It provides the session layer 96 with a message transfer facility that is independent of the underlying network type. By providing the session layer 96 with a defined set of message transfer facilities, the transport layer 98 hides the detailed operation of the network layer 100 from the session layer 96.

The transport layer 98 offers a number of service classes, which cater to the varying quality of service provided by different types of networks. There are five service classes ranging from class 0, which provides only basic functionality required to establish a connection and perform a data transfer, to class 4, which provides full error control and flow control procedures. As by way of example, a class 0 data transfer may be selected for use with a packet-switched data network, whereas, a class 4 data transfer may be selected for use with a LAN.

Network-Dependent Layers

The lowest three layers of the ISO reference model are network dependent, as such, their detailed operation varies from one network type to another. However, some generalities can be made as further illustrated in FIG. 4B.

The Network Layer

The network layer 100 is responsible for establishing and clearing a network wide connection between to two transport layer protocol entities. It includes such facilities as network routing and addressing and, in some instances, flow control across the computer to network interface. In the case of internetworking, the network layer 100 provides various harmonizing functions between the interconnected networks.

The Link Layer

The link layer 102 builds on the physical connection provided by the particular data network 78 to provide the network layer 100 with a reliable information transfer facility. The link layer 102 is responsible for error detection, and in the event of transmission errors, the retransmission of messages. Two types of service are provided: connectionless service treats each information frame as a self-contained entity that is transferred using a best-try approach; and connection oriented service endeavors to provide an error-free information transfer facility.

The Physical Layer

Finally, the physical layer 104 is concerned with the physical and electrical connections or interfaces between the computer A 80' and the data network 78. The physical layer 104 provides the link layer with a means of transmitting a serial bit stream between the communicating computers A, B 80' 82 (computer B not shown).

Figure 4C:
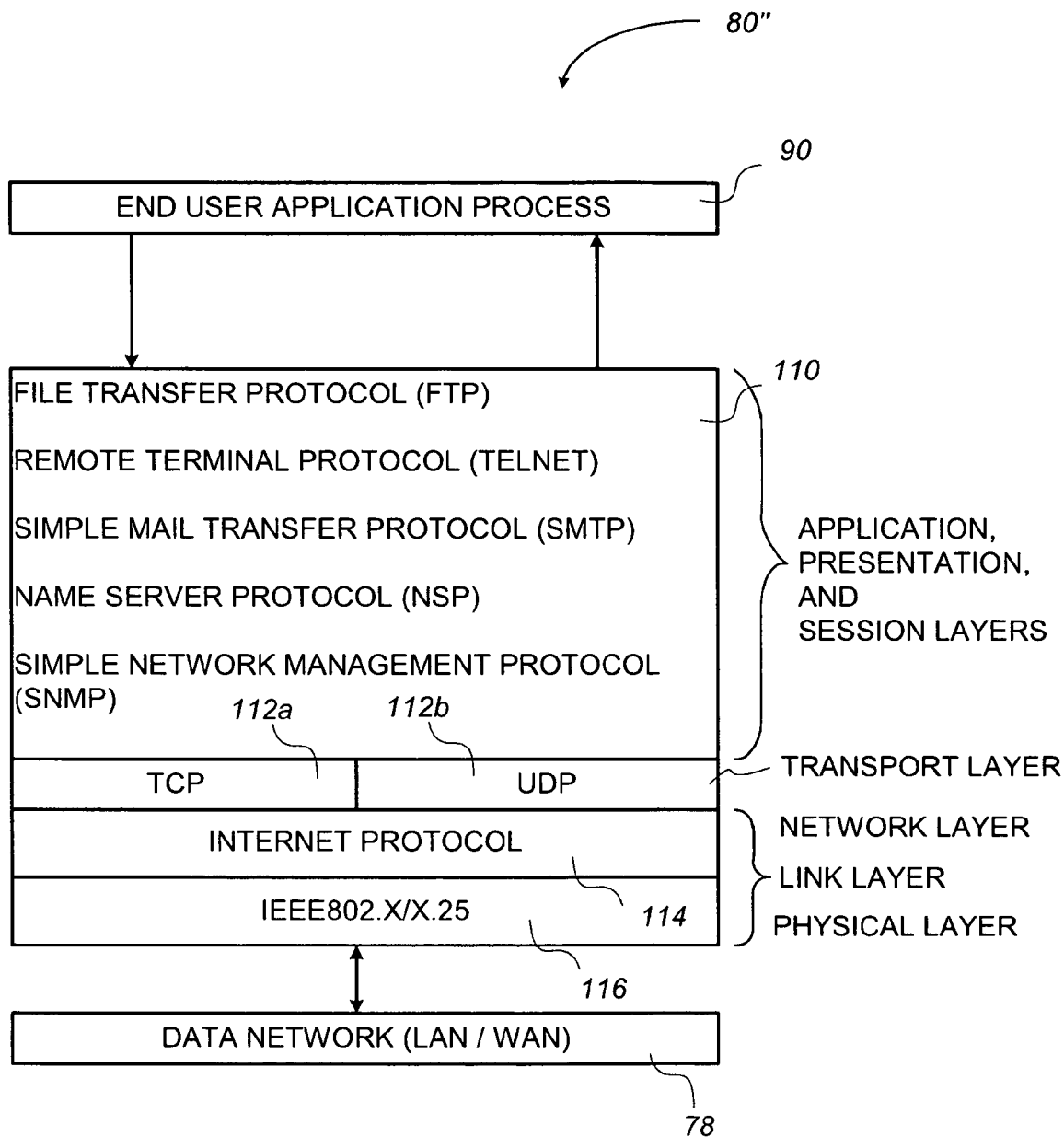
FIG. 4C is a diagram illustrating the relationship between the OSI layers and transmission control protocol/Internet protocol.

Having described both the ISO reference model for OSI with regard to FIG. 4A, and the seven protocol layers of the reference model with regard to FIG. 4B, reference is now directed to FIG. 4C. In this regard, FIG. 4C is a diagram illustrating the relationship between the seven OSI layers and the currently popular transmission control protocol/Internet protocol (TCP/IP) for data transfers between end-user application processes 90 on the Internet.

The TCP/IP suite may be summarized as illustrated in FIG. 4C. As in the OSI reference model previously described with regards to FIGS. 4A and 4B, the TCP/IP serves to enable data transfers between an end-user application process 90 operative on a computer A 80" and a remotely located computer B 82 (not shown) coupled to a data network 78 herein further illustrated as either a local area network (LAN) or a wide area network (WAN). The TCP/IP includes both network-oriented protocols and application support protocols. FIG. 4C shows some of the standard protocols supported along with their relation to the seven protocol layers of the OSI reference model.

As illustrated in FIG. 4C, the file transfer protocol (FTP), the remote terminal protocol (TELNET), the simple mail transfer protocol (SMTP), the name server protocol (NSP), and the simple network management protocol (SNMP) are representative protocols provided by the TCP/IP suite 110. As is further illustrated in FIG. 4C, the aforementioned protocols relate to the application, presentation and session layers of the OSI reference model previously described with regards to FIGS. 4A and 4B.

As shown in FIG. 4C, a TCP 112a resides at the transport layer of the ISO reference model along with a user datagram protocol (UDP) 112b. As further illustrated in FIG. 4C, an Internet protocol (IP) 114 resides below the transport layer and relates to the lowest three levels of the ISO reference model. Below the IP 114 resides a set of joint physical connection standards herein designated as IEEE802.X/X.25 116 that define the physical interconnections for existing switched data networks 78.

It is important to note that since TCP/IP was developed concurrently with the ISO initiative to develop an OSI standard, TCP/IP does not contain specific protocols related to all of the seven OSI reference model layers. Nevertheless, most of the functionality associated with the ISO reference model layers is embedded within the suite of protocols illustrated in FIG. 4C.

Figure 5A:
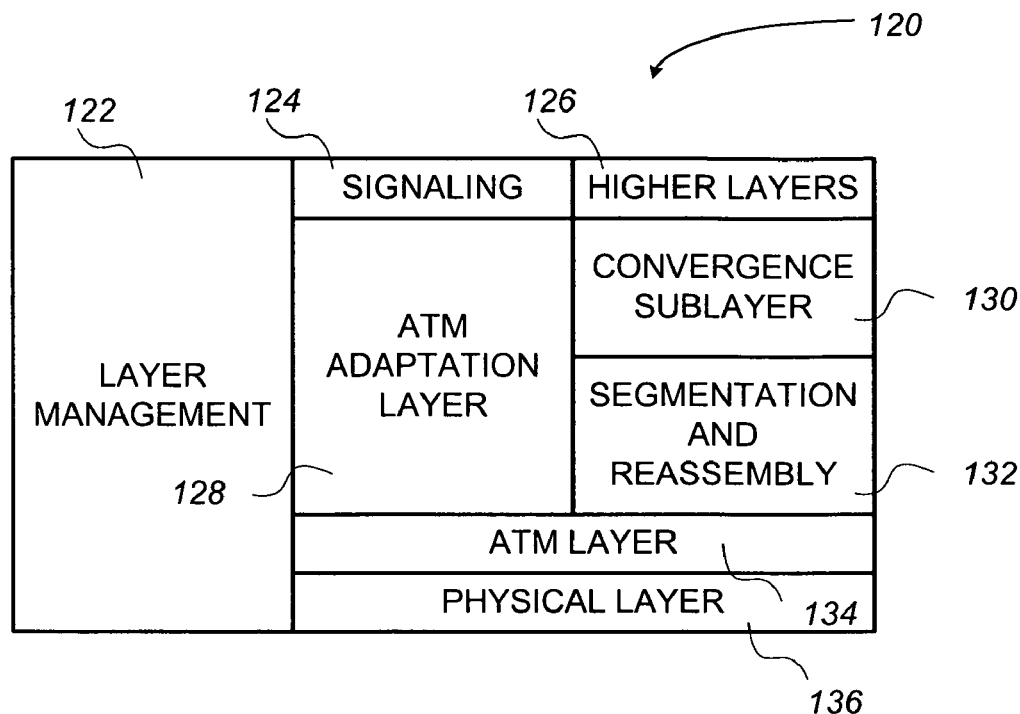
FIG. 5A is a diagram illustrating the broadband integrated services digital network (B-ISDN) protocol reference model.

Having described both the relationship between the seven ISO reference model layers with the TCP/IP suite for data transfers between end user application processes 90 on the Internet with regard to FIG. 4C, reference is now directed to FIG. 5A. FIG. 5A is a diagram illustrating a broadband integrated services digital network (B-ISDN) protocol reference model. A B-ISDN is an all purpose digital network to facilitate worldwide information exchange between any two subscribers without limitations introduced or imposed by either the medium or the data to be transferred. Asynchronous transfer mode (ATM) is the transport mode of choice for B-ISDN. ATM is a connection-oriented packet-switching technique that uses a 53-byte fixed size cell to transfer information via a network. The short packet size of ATM, at high transmission rates, offers the flexibility to provide a wide range of services required by different end-user applications. The term asynchronous indicates that the cells generated by a source may appear at irregular intervals in the network. The connection-oriented nature of ATM arises out of the need to reserve resources in the network to meet the quality of service (QOS) requirements of end-user applications.

As illustrated in FIG. 5A, the B-ISDN protocol reference model 120 comprises layer management 122, a signaling layer 124, higher layers 126, an ATM adaptation layer 128, an ATM layer 134, and a physical layer 136. The ATM adaptation layer 128 as illustrated in FIG. 5A may be further described as comprising both a convergence sublayer 130 and a segmentation and reassembly (SAR) sublayer 132.

The signaling layer 124 and the higher layers 126 illustrated at the uppermost levels in the ATM protocol may be further described as a user layer. Thus the B-ISDN protocol reference model of FIG. 5A can be described as comprising a physical layer 136, an ATM layer 134, an ATM adaptation layer 128, and a user layer (signaling 124 and higher layers 126). The physical layer 136 transports cells between two ATM entities. It guarantees, within a certain probability, the cell header integrity and merges user cells to generate a continuous bit stream across the physical medium. The ATM layer 134 transfers fixed size ATM cells between the users of the ATM layer 134 by preserving the cell sequence integrity. The ATM layer 134 includes the following: cell structure and encoding; message traffic control; services provided to the ATM adaptation layer 128; and services expected from the physical layer 136.

The ATM layer 134 deals with the functions of the cell header independent of the type of information carried in the cell. Thus simplicity and flexibility are achieved by omitting various services required by end-user application processes 90 (see FIGS. 4A–4C). In particular, the ATM layer 134 does not provide information on the frequency of the service clock, detection of erroneously inserted cells, detection for lost or omitted cells, means to determine and handle cell delay variation, and awareness of the content of the user information.

The main reason for not providing these services at the ATM layer 134 is that not all end-user application processes 90 (see FIG. 4C) require these services. As by way of example, data traffic does not require information on the frequency of the service clock, whereas, voice encoded data may require awareness on the contents of the information. Accordingly, the functionality required by various data services are grouped into a small number of classes that are supported by different ATM adaptation layers 128.

There are four service classes, as well as, a user defined class of service. Class A corresponds to services that require a constant bit rate (CBR) connection. Class A services require timing synchronization between the source and the destination nodes. Two examples are 64 kb/s pulse code modulation voice and CBR video. Class B corresponds to a variable bit rate (VBR) connection-oriented service. Class B services also require a timing relation between the source and the destination nodes. VBR encoded video is an example of a data service which falls into the B service class. Class C corresponds to VBR connection-oriented service with no timing relation between the source and the destination node. A typical service within the C service class is a connection-oriented data transfer. Class D corresponds to a VBR connectionless service with no timing relation between the source and the destination node. Connectionless data transfer between two LANs over a WAN, such as the Internet, is an example of a class D type service. Class X service is a raw cell service to allow for proprietary vendor-defined ATM adaptation layers 128.

As introduced herein above, the ATM adaptation layer 128 further comprises a convergence sublayer (CS) 130 and a segmentation and reassembly (SAR) sublayer 132. A transmit node SAR sublayer 132 receives CS-protocol data units (CS-PDUs) and segments them, or collects in the case of CBR services, so that when a SAR header/trailer is added to the PDU, the final payload fits into one ATM payload portion of 48 bytes. On the receiving end, the SAR sublayer 132 reconstructs the CS-PDUs from received cells and passes them to the CS sublayer 130. The CS sublayer 130 is further divided into a common portion and a service specific portion (not shown). The common portion of the CS sublayer 130 performs functions common to a particular ATM adaptation layer 128 class of users. The service specific requirements of different classes of users, for example, timing recovery for real-time applications, are implemented in the service specific portion of the CS sublayer 130. For services that do not require any specific function, the service specific portion may be null.

CBR services in the ATM framework are assumed to require a timing relationship between the end nodes. VBR services, on the other hand, are further classified into two subcategories depending upon whether an end-to-end timing relationship is required. The former classification is intended for applications such as VBR video and audio. The latter classification is for data services. These data-service applications may be further classified based on those that require a connection-oriented data transfer and those that transfer data via a connectionless application service.

Figure 5B:
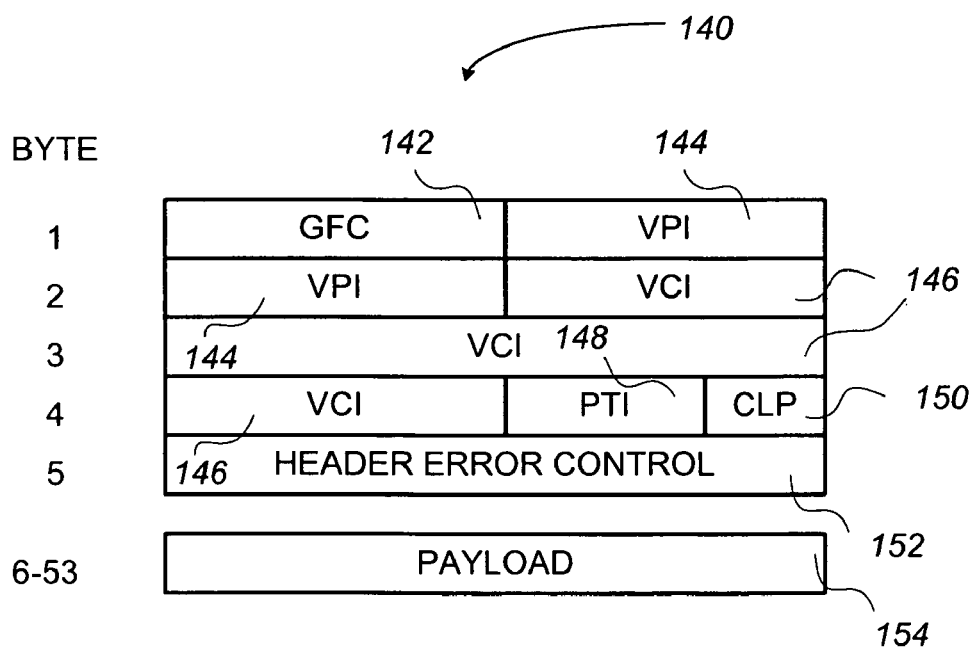
FIG. 5B is a diagram illustrating the cell format of a transmission mode of choice, asynchronous transfer mode (ATM), in B-ISDNs.

Having described the B-ISDN protocol as illustrated in FIG. 5A, along with ATM layers and service classes, reference is now directed to FIG. 5B. In this regard, FIG. 5B illustrates the ATM cell format. As illustrated in FIG. 5B, an ATM cell 140 comprises 53 bytes, with the first five bytes forming a cell header and the remaining 48 bytes a payload 154. As further illustrated in FIG. 5B, the ATM cell header comprises a first byte consisting of two fields, a generic flow control (GFC) field 142 and a virtual path identifier (VPI) 144. The second byte of the ATM cell header also contains two fields, a second portion of the VPI and a first portion of a virtual channel identifier (VCI) field 146. The third byte of the ATM cell header comprises a second portion of the VCI 146. The fourth byte of the ATM cell header comprises a third portion of the VCI 146, a payload type identifier (PTI) field 148, and a cell loss priority (CLP) field 150. The fifth and last byte of the ATM cell header comprises a header error control field 152.

The GFC field 142 is a 4-bit field providing flow control and fairness at a user-network interface. It is not used to control data traffic in the other direction, that is, network to user traffic flow. The GFC field 142 has no use within the network and is meant to be used only by access mechanisms that implement different access levels and priorities.

ATM data transfers require established connections prior to initiating and completing a data transfer. ATM uses routing tables at each node along the path of a connection that map the connection identifiers from the incoming links to the outgoing links. There are two levels of routing hierarchies, virtual paths (VPs) and virtual channels (VCs). A VC uses a unique identifier used to describe the unidirectional transport of cells from one end user to a remotely located end user. A VP is a collection of one or more VCs between two nodes. Each VP has a bandwidth associated with it limiting the number of VCs that can be multiplexed on the VP. VPIs are used to route packets between two nodes that originate, remove, or terminate the VPs, whereas, VCIs are used at these end nodes to distinguish between individual connections. It is significant to note that there is no difference between a VP and a VC when a VP is defined over a single physical link. When a VP is defined over two or more physical links, it reduces the size of the routing tables by allowing a number of VCs to be switched based upon a single identifier, that is, a VPI 144.

The PTI field 148 defines what is transmitted in the cell payload. The CLP field 150 of the ATM cell header is a 1-bit field that provides limited flexibility by defining two cell-loss priorities. The header error control field 152 is used mainly to discard cells with corrupted headers and to delineate cells. Where cell delineation is determining the cell boundaries from the received bit stream. The 8-bit field provides single-bit error correction and a low probability corrupted cell delivery capabilities.

A possible end-to-end model for data communications using an xDSL data transfer medium consists of TCP/IP running on top of PPP, which runs on top of ATM. The QOS and VC flexibility inherent in ATM permits a single user access to many different data sources simultaneously. As by way of example, a single user may surf the net, download a software application, listen to a web radio station, and check corporate Email by accessing a virtual private network. Ideally, a single user could have multiple open "windows" or active applications each of which may be connected to a separate VC with each of the aforementioned data services received and transmitted via logically separate data streams through the xDSL interface to the WAN.

In order to extend the single user to WAN model introduced above to permit communications between a multi-drop LAN 200 and a WAN, the multi-drop LAN 200 or SOHO network may be configured with identical hardware and software installed on each computer on the LAN 200. A master computer or master node may be selected using one or more LAN 200 initialization algorithms. Should a particular computer or node fail either as the result of hardware or software problems, the LAN 200 may be re-configured with a new master computer selected to assume control of the gateway function between the LAN 200 and the WAN. It will be appreciated by those skilled in the art that a number of topologies and architectures for the LAN 200 exist. A system and method to interface a LAN 200 to a WAN in accordance with the present invention may be implemented with any of a number of LAN 200 configurations. Regardless of the LAN 200 architecture and the protocol used for local communications on the LAN 200, a communications device in accordance with the teachings of the present invention may be integrated with each computer of the LAN 200 to provide local communications between each of the computers.

Several techniques may be used for establishing LAN 200 communications. A few non-limiting examples follow. A first technique can use frequency bands outside of the xDSL bands (frequencies greater than 1 MHz). A second technique can use frequency bands that fall in the spectrum between xDSL bands and an upper frequency limit of 1 MHz. A third technique may take advantage of a particular variety of xDSL and use the xDSL backbone to create specialized signals to negotiate frequency bands that may be used for communications between the various LAN 200 devices.

By taking advantage of the fact that devices on a LAN 200 can communicate with a master computer, as described above, along with the fact that a master computer can connect to a remotely located WAN using multiple VCs, it is possible to assign one or more VCs to each of the nodes on a LAN 200 to permit multiple user access over a single xDSL LAN 200 to WAN interface. A system and method to interface a LAN 200 to a WAN in accordance with the present invention may provide many advantages. As by way of example, a single Internet access subscription fee may allow multiple users to gain access simultaneously. The router function of the LAN 200 to WAN gateway essentially transforms into an ATM switching function. Incoming ATM cells destined for a particular PC need only to traverse a simple switching fabric which may be implemented in hardware or software. The master computer could be extended to perform as a "firewall" between the two networks as all traffic entering and leaving the WAN may be processed by the master computer. In this regard, the master computer may be configured with software to govern access, traffic rates, time-of-day specific limitations, and any of a number of other network "traffic cop" functions.

As will be further explained along with FIGS. 6 through 9, a master computer on the LAN 200 may be configured to negotiate and initialize a number of VCs. The master computer may be further configured to map or distribute the VCs among the various LAN 200 connected devices. The master computer then redirects incoming and outgoing ATM cells onto the appropriate VC. As a result, the CO/WAN end of the network sees only the master computer. WAN connected devices have no idea, which of the LAN 200 interconnected devices is the ultimate destination for the ATM cells.

A Point to Multi-Point Digital Subscriber Line Communication System

Figure 6:
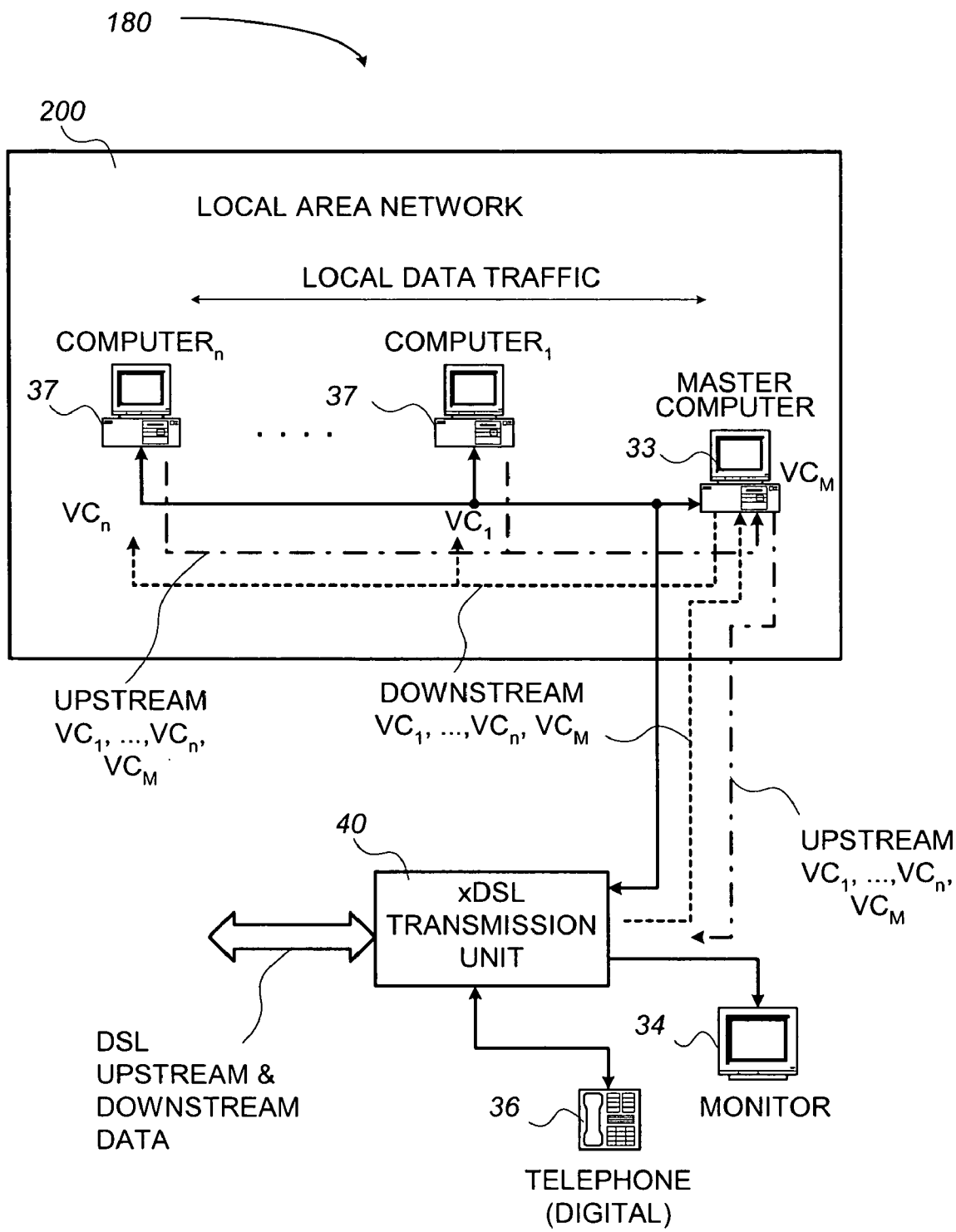
FIG. 6 is a functional block diagram illustrating a first embodiment of a point to multi-point DSL communication system in accordance with the present invention.

Having described the ATM cell format as illustrated in FIG. 5B and briefly introduced how a master computer on a LAN can be configured to enable a LAN to WAN interface, reference is now directed to FIG. 6. In this regard, FIG. 6 illustrates a first embodiment of a point to multi-point DSL communication system consistent with the teachings of the present invention. A point to multi-point DSL communication system 180 in accordance with the present invention can be implemented in hardware, software, firmware, or a combination thereof. In preferred embodiment(s), the point to multi-point DSL communication system 180 may be implemented in software or firmware that is stored in a memory and that is executed by a suitable instruction execution system. If implemented in hardware, as in an alternative embodiment, the point to multi-point DSL communication system 180 can be implemented with any or a combination of the following technologies, which are well known and appreciated by those skilled in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As illustrated in FIG. 6, a point to multi-point DSL communication system 180 may be configured with a LAN 200 integrated with a xDSL transmission unit 40 in communication with a xDSL card 22 located within a central office 12 (see FIGS. 1–3). The point to multi-point DSL communication system 180 may further comprise xDSL service related end-user equipment not connected to LAN 200, such as a digital telephone 36 and a monitor 34.

As previously described in relation to FIGS. 1–3, DSL upstream and downstream data may be transmitted (upstream) and received (downstream) from an appropriately configured xDSL transmission unit 40 in communication with a remotely located similarly configured xDSL card 22. As illustrated in FIG. 6, LAN 200 in communication with the xDSL transmission unit 40 may designate or assign a single computer or node on the LAN as a master computer 33. The master computer 33 may be configured to identify remaining computers 37 co-located on the LAN 200. Having identified the remaining computers 37 on the LAN 200, the master computer 33 may be configured to assign an ATM virtual channel (ATM VC) to each of the identified computers 37. A number of mechanisms are known and understood by those skilled in the art for establishing a master node when multiple nodes exist on a communications channel or LAN 200, these mechanisms need not be described herein to appreciate the point to multi-point DSL communication system 180 of the present invention.

Having identified the co-located computers 37 on the LAN 200, assigned a particular VC for each of the identified computers 37, and having assigned a VC for itself, the master computer 33 has prepared the LAN 200 for point to multi-point communications from a remotely located LAN/WAN through the DSL communication link. In this regard, communications to and from the CO-DSLAM 20 (see FIGS. 1 and 2) may occur through the master computer 33. Since communication between the computers 37 on the LAN 200 and the CO-DSLAM 20 (see FIGS. 1 and 2) may occur via the master computer 33, the remote data service, be it an Internet service provider (ISP) or other DSL related service source provider, can be configured to provide its respective data service to each of the computers 37, 33 on LAN 200 while only "seeing" the master computer 33 at the CPE end of the DSL communications link.

As further illustrated in FIG. 6, upstream DSL data from computers 37 destined for the CO xDSL card 22 (not shown—see FIGS. 1–3) may be processed through master computer 33 which may remove and replace the $VC_{1-n}$ identifier with the $VC_M$ identifier prior to forwarding the upstream data traffic to xDSL transmission unit 40 for final upstream processing and transmission to the CO xDSL card 22 (not shown—see FIGS. 1–3). Similarly, downstream DSL data received at the xDSL transmission unit 40 may be distributed to each of the computers 33, 37 on LAN 200 by forwarding the downstream data via the master computer 33. In this regard, downstream DSL data that arrives at the master computer 33 may be processed within the master computer 33 and forwarded to the appropriate computer 37 by maintaining protocol stacks for each of the outstanding VCs between the computers 33, 37 on LAN 200 and the CO xDSL card 22 (not shown—see FIGS. 1–3).

It is important to note that "local," that is, network data traffic between computers 33, 37 located on LAN 200, is not required to pass through the master computer 33 and may proceed using any of a number of well known techniques, i.e., (tone reservation, single carrier, etc.), in conjunction with appropriate MAC layer technology.

Figure 7:
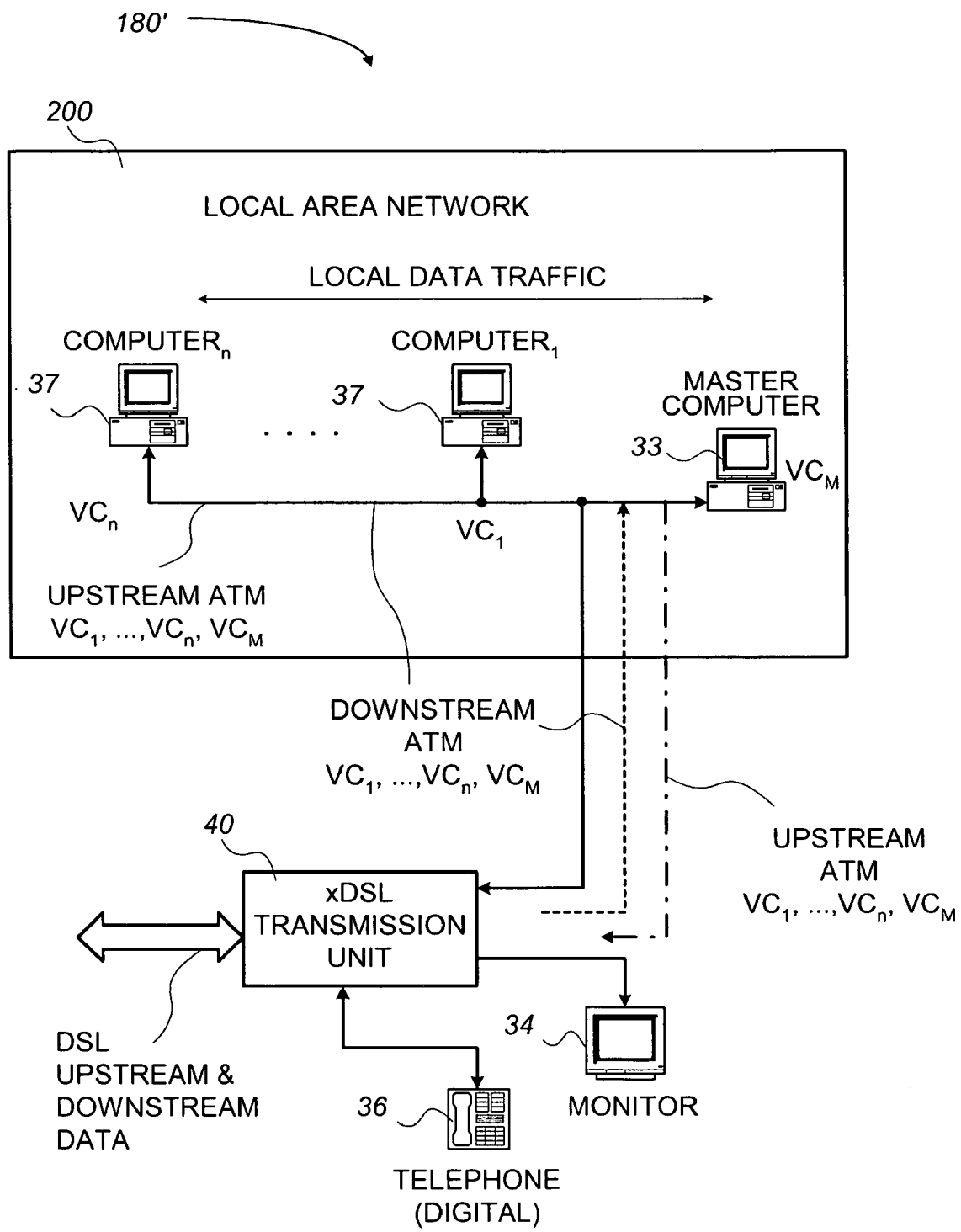
FIG. 7 is a functional block diagram illustrating a second embodiment of a point to multi-point DSL communication system in accordance with the present invention.

Having described a first embodiment of a point to multi-point DSL communication system 180 as illustrated in FIG. 6, reference is now directed to FIG. 7. In this regard, FIG. 7 illustrates a second embodiment of a point to multi-point DSL communication system 180' consistent with the teachings of the present invention.

As illustrated in FIG. 7, a point to multi-point DSL communication system 180' may be configured with a LAN 200 integrated with a xDSL transmission unit 40 in communication with a xDSL card 22 located within a central office 12 (see FIGS. 1–3). The point-to multi-point DSL communication system 180' may further comprise xDSL service related end-user equipment not connected to LAN 200, such as a digital telephone 36 and a monitor 34.

As previously described in relation to FIGS. 1–3, DSL upstream and downstream data may be transmitted (upstream) and received (downstream) from an appropriately configured xDSL transmission unit 40 in communication with a remotely located similarly configured xDSL card 22. As illustrated in FIG. 7, LAN 200 in communication with the xDSL transmission unit 40 may designate or assign a single computer or node on the LAN as a master computer 33. The master computer 33 may be configured to identify remaining computers 37 co-located on the LAN 200. Having identified the remaining (non-master) computers 37 on the LAN 200, the master computer 33 may be configured to assign an ATM virtual channel (ATM-VC) to each of the identified computers 37.

Having identified the co-located computers 37 on the LAN 200, assigned and notified each computer 37 of its particular ATM-VC, and having assigned an ATM-VC for itself, the master computer 33 has prepared the LAN 200 for point to multi-point communications from a remotely located LAN/WAN through the DSL communication link. In this regard, downstream DSL communications from the CO-DSLAM 20 (see FIGS. 1 and 2) may occur through LAN 200 and may be available for receipt by each of the computers 33, 37 located on the LAN 200. Only the appropriately mapped computer 33, 37 will recognize the ATM-VC, remove the traffic, and inform the master computer 33 that downstream traffic has been removed.

Similarly, upstream DSL traffic on LAN 200 may be mapped onto the ATM layer by applying the appropriate ATM-VC to the data traffic and forwarding the traffic in the upstream data channel. The advantage of this configuration and method is that it reduces the load on the master computer 33. This technique allows traffic with the correct ATM-VC to pass through the downstream network without intervention by the master computer 33, thus improving overall throughput and performance of the network.

Figure 8:
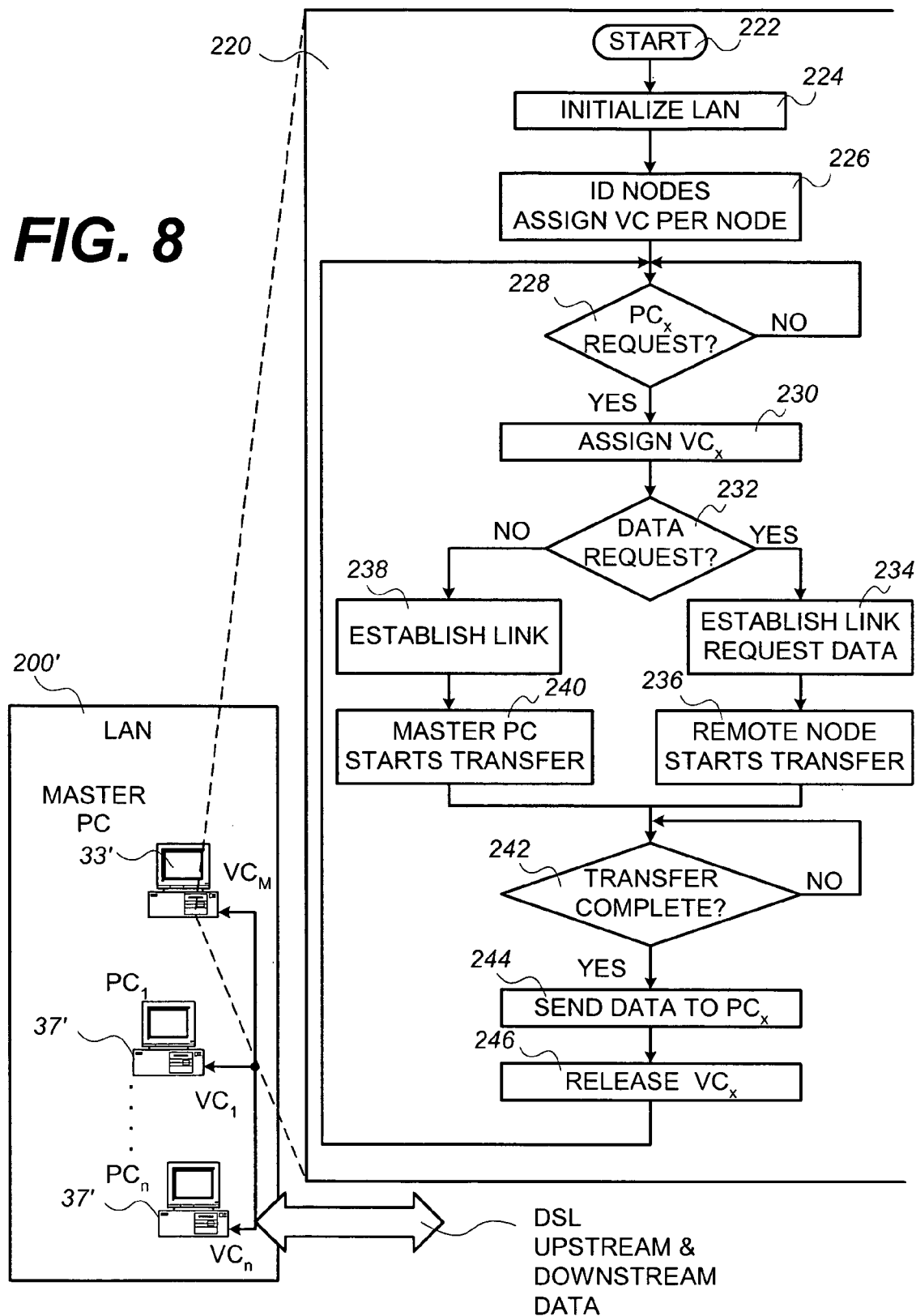
FIG. 8 is a flowchart illustrating a method for establishing a point to multi-point DSL communication link as may be implemented by the embodiment of FIG. 6.

Having described a second embodiment of a point to multi-point DSL communication system 180' as illustrated in FIG. 7, reference is now directed to FIG. 8. In this regard, FIG. 8 illustrates a flowchart describing a method for establishing a point to multi-point DSL communication system 180 that may be implemented by the embodiment of FIG. 6.

It is important to note that any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

As illustrated in FIG. 8, a LAN 200' comprising a master personal computer (PC) 33' and other PCs 37' in communication with a remotely located DSL line card 22 (see FIGS. 1–3) may establish a point to multi-point DSL communication system 180 (see FIG. 6) with remote devices by performing a method 220. In this regard, the method 220 begins with step 222 designated "start." The method 220 proceeds by initializing LAN 200' in step 224. Having initialized the LAN 200', the method 220 continues by performing step 226, identifying nodes (PCs) located on the LAN 200' and assigning a VC to each identified node. In step 228, the method 220 checks if a $PC_x$ data transfer request is pending. If a $PC_x$ data transfer request is encountered, the method 220 may assign a $VC_x$ identifier in step 230 to identify the source and destination nodes of the particular channel. Once the master PC 33' generates and assigns the $VC_x$ to the requested channel, the master PC 33' may instruct the $PC_x$ 37' to look for data traffic on $VC_x$. If the master PC 33' does not find a pending $PC_x$ data transfer request on the LAN, the method 220 simply repeats step 228 until a $PC_x$ data transfer request is encountered.

Having identified a $VC_x$ for the request, the method 220 performs step 232 where a determination is made if the data request is for DSL downstream data or DSL upstream data. If the determination in step 232 is affirmative, that is DSL downstream data is requested by $PC_x$ 37', master PC 33' may establish a communications link with the remote node or service in step 234 via the DSL using the previously generated $VC_x$. Having successfully established a link with the remote node or service, the master PC 33' can request the data as a proxy for the requesting $PC_x$ 37'. Next, in step 236, the remote node may start the data transfer. If the determination in step 232 is negative, that is DSL upstream data is to be sent to a remote node, the method 220 performs step 238, where the master PC 33' establishes a communication link with the remote node using the previously identified $VC_x$. Having established the VC, the master PC 33' may send the data as a proxy for the requesting $PC_x$ 37' in step 240.

Next, in step 242 the master PC 33' checks if the data transfer has been completed. If it is determined in step 242 that the transfer is still in progress, the method may simply repeat step 242 until the data transfer is complete. Once master PC 33' determines that the data transfer is complete, the master PC 33' may send the data along LAN 200' to the requesting $PC_x$ as illustrated in step 244. Having sent the data in step 244, the master PC 33' may release or terminate the $VC_x$ in step 246. The method 220 may maintain the point to multi-point DSL communication link by repeating steps 228–246 as previously described.

Figure 9:
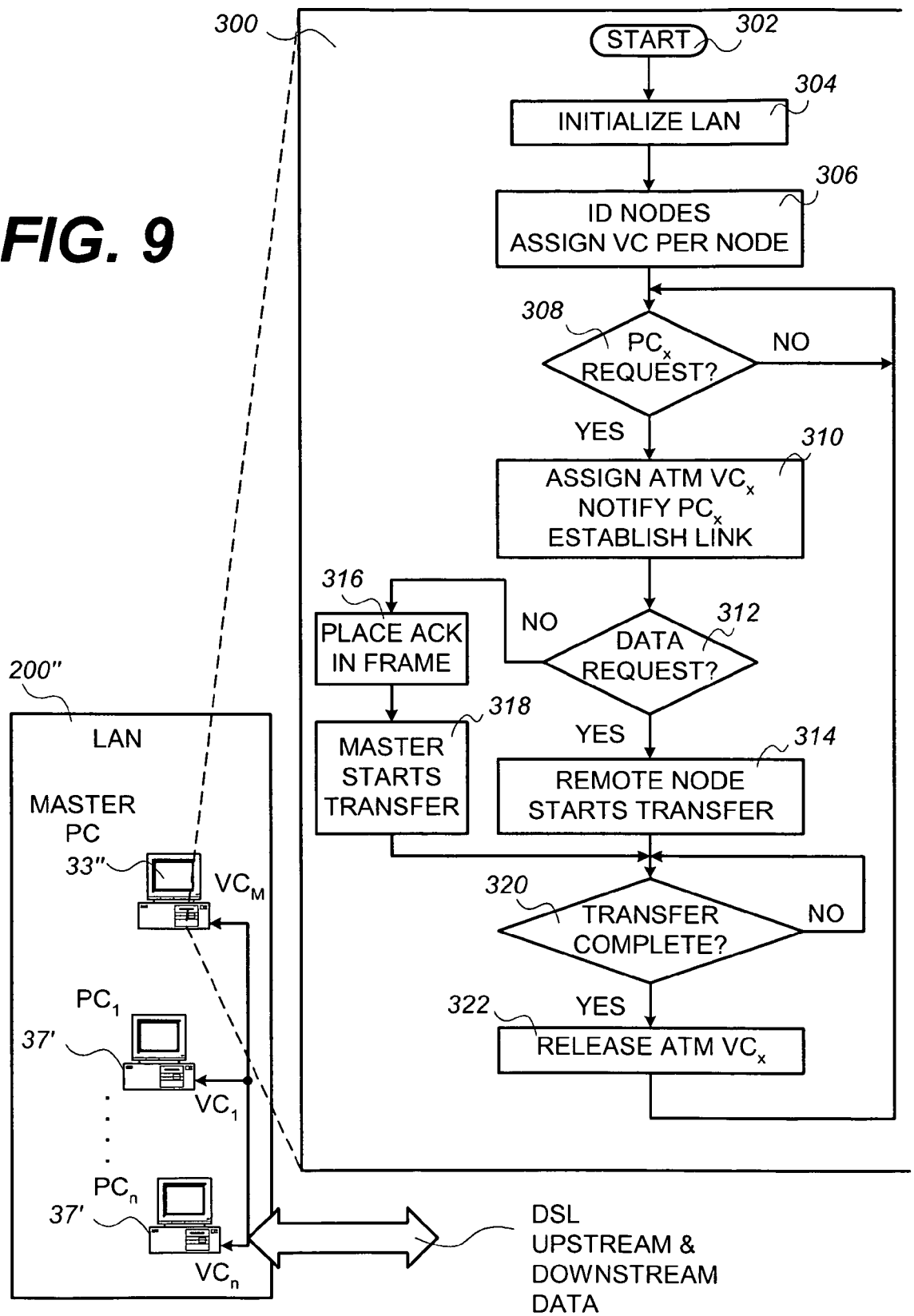
FIG. 9 is a flowchart illustrating a method for establishing a point to multi-point DSL communication link as may be implemented by the embodiment of FIG. 7.

Having described a method 220 for establishing a point to multi-point DSL communication system 180 that may be implemented by the embodiment of FIG. 6 with regard to the flow chart of FIG. 8, reference is now directed to FIG. 9. In this regard, FIG. 9 illustrates a flow chart describing an alternative method of establishing a point to multi-point DSL communication system 180' consistent with the teachings of the present invention.

As illustrated in FIG. 9, a LAN 200" comprising a master PC 33" and other PCs 37' in communication with a remotely located DSL line card 22 (see FIGS. 1–3) may establish a point to multi-point DSL communication system 180' with remote devices by performing a method for establishing a point to multi-point DSL communications system 300 in accordance with the present invention. In this regard, the method 300 begins with step 302 designated "start." The method 300 proceeds by initializing LAN 200" in step 304. Having initialized the LAN 200", the method 300 continues by performing step 306 identifying nodes (PCs) located on the LAN 200" and assigning a VC to each identified node. In step 308, the method 300 checks if a $PC_x$ data transfer request is pending. If a $PC_x$ data transfer request is encountered, the method 300 performs step 310 where it assigns an ATM-$VC_x$ identifier, notifies the requesting $PC_x$ of the ATM-$VC_x$ identifier, and establishes a link with the remote node using the ATM-$VC_x$ identifier. If the master PC 33" does not find a pending $PC_x$ data transfer request on the LAN 200", the method 300 simply repeats step 308 until a $PC_x$ data transfer request is encountered.

Having identified an ATM-$VC_x$ for the request, the method 300 performs step 312 where a determination is made if the data request is for DSL downstream data or DSL upstream data. If the determination in step 312 is negative, that is DSL upstream data is desired to be transmitted by $PC_x$ 37', master PC 33" may be configured to insert an acknowledgement in the ATM frame in step 316 and start the upstream data transfer in step 318. If the determination in step 312 is affirmative, that is DSL downstream data is requested, the remote node may start the data transfer at any time after the link is established as illustrated in step 314.

Next, in step 320 the master PC 33" checks if the data transfer has been completed. If it is determined in step 320 that the transfer is still in progress, the method may simply repeat step 320 until the data transfer is complete. Once master PC 33" determines that the data transfer is completed, the master PC 33" may release or terminate the ATM-$VC_x$ as illustrated in step 322. The method 300 may maintain the point to multi-point DSL communication link by repeating steps 308–322 as previously described.

As by way of example, if $PC_1$ 37' desires to communicate with a remote node via the DSL communication link it may initiate a data request via the LAN 200" to master PC 33". The master PC 33" having received the data request, may use the ATM signaling stack to establish a connection with the remote node (not shown). Subsequent upstream traffic to the remote node may be sent via the master PC 33". It is significant to note that the above method in no way affects localized LAN data traffic, i.e., control information between $PC_1$ 37' and the master PC 33", which may be transmitted and received via the LAN 200".

A VC may be reserved for this session. The master PC 33" and $PC_1$ 37' can then be made aware of the assignment. As by way of example, the master PC 33" can be made aware of the VC assignment via the signaling stack. Subsequent local or LAN 200" communications between the master PC 33" and $PC_1$ 37' may instruct $PC_1$ 37' to "watch for traffic on $VC_x$." Furthermore, $PC_1$ 37' may request information from the WAN by sending a request over a local LAN 200" communications channel to the master PC 33". The WAN may then return information using ATM $VC_x$ to the LAN 200", where $PC_1$ 37' may remove the information by processing a protocol stack.

Upstream acknowledgments may be created in the stack located at $PC_1$ 37'. The acknowledgements or "ACKs" may then be placed in ATM frames and sent to the master PC 33". The master PC 33" may be configured to map the incoming ATM cells from $PC_1$ 37' onto the $VC_x$ that was assigned by the ISP. ACKS may then be forwarded along one or more networks to the remote destination. As a result, the communications protocols remain in synchronization. When communications for a particular transaction are complete, the local channel from $PC_1$ 37 to the master PC 33" may notify the master PC 33" to terminate the transaction. VCs may then be released and the process is complete.

The flow charts illustrated in FIGS. 8 and 9 may be converted to an ordered listing of executable instructions for implementing logical functions and may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It will be appreciated by those skilled in the art that a number of communication media may be used to complete the network bridge between the LAN 200 and the WAN. As by way of non-limiting examples, the link or bridge may be completed via a community antenna television (CATV) network and/or a wireless radio-frequency (RF) network. In one preferred embodiment, the bridge may be completed with an optically coupled device. Alternatively, if a xDSL modem and the PSTN are used to complete the link, it is preferable to complete the link with a symmetrical DSL (SDSL) modem. It will be further appreciated by those skilled in the art that each alternative link or bridge medium may require a communication device in accordance with the present invention to be integrated with the CATV or RF network in order to complete the LAN 200 to WAN/Internet bridge. Furthermore, each device on the LAN 200 may be configured to support LAN 200 communications with the CATV or RF network master computer devices.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

The invention claimed is:

1. A local area network (LAN) to wide area network (WAN) communication system comprising:
   a first computer;
   a first communication device electrically coupled to the first computer configured to provide communications over a LAN, the first communication device in communication with a WAN via a first communication link;
   a second computer; and
   a second communication device electrically coupled to the second computer configured to provide communications over the LAN between the second and the first computers, wherein the first computer is configured to assign at least one virtual connection for each of the first and second computers to enable the first computer to route WAN data traffic across the LAN.

2. The communication system of claim 1, wherein the first communication link comprises a xDSL communication link.

3. The communication system of claim 1, wherein local area network (LAN) data signals are transmitted via frequencies greater than 1 MHz.

4. The communication system of claim 1, wherein the first computer manages simultaneous data transfers between both itself and the second computer over the first communication link.

5. The communication system of claim 1, wherein the at least one virtual connection is identified and managed via an asynchronous transfer mode (ATM) protocol.

6. The communication system of claim 2, wherein local area network (LAN) data signals are transmitted via frequencies less than 1 MHz and wherein the frequencies fall between identified xDSL frequencies.

7. The communication system of claim 1, wherein each of the first and second computers are configured with a first and second communication device respectively, each of the first and second communication devices configured to enable local area network (LAN) communications between the first and second computers and wherein each of the first and second communication devices in cooperation with their respective computer is configured to assign at least one virtual connection for each of the first and second computers to enable either of the first and second computers to route wide area network (WAN) data traffic across the LAN.

8. The communication system of claim 7, wherein a master computer and a slave computer are selected from the first and second computers using one or more initialization algorithms.

9. The communication system of claim 8, wherein the slave computer is configured to reconfigure the local area network (LAN) upon detecting a master computer failure.

10. The communication system of claim 8, wherein the master computer applies a set of rules derived from a group of parameters consisting of access, traffic rates, and time-of-day when assigning the at least one virtual connection to each of the master and the slave computers.

11. The communication system of claim 1, wherein the first communication link comprises a community antenna television (CATV) network link.

12. The communication system of claim 1, wherein the first communication link comprises a wireless network link.

13. A method for managing bi-directional local area network (LAN) to wide area network (WAN) data transfers in a communication system comprising:
   using a master computer to assign at least one virtual connection to each computer in communication with the LAN;
   receiving a downstream signal (WAN to LAN) at a transceiver coupled to the master computer;
   forwarding the downstream signal to the master computer;
   identifying at least one computer designated to receive the downstream signal;
   forwarding the downstream signal to the at least one designated computer on the LAN;
   receiving an upstream signal (LAN to WAN) at the master computer; and
   forwarding the upstream signal from the master computer to the transceiver.

14. The method of claim 13, wherein the transceiver is a xDSL compatible transceiver.

15. The method of claim 13, wherein local area network (LAN) data signals are transmitted via frequencies greater than 1 MHz.

16. The method of claim 13, wherein the master computer manages simultaneous wide area network (WAN) data transfers between both itself and each other computer in communication with the local area network (LAN) via the transceiver.

17. The method of claim 13, wherein the at least one virtual connection is identified and managed via an asynchronous transfer mode (ATM) protocol.

18. The method of claim 13, wherein local area network (LAN) data signals are transmitted via frequencies less than 1 MHz and wherein the frequencies fall between identified digital subscriber line (DSL) frequencies.

19. The method of claim 13, wherein each computers on the local area network (LAN) is configured with a compatible communication device, each communication device configured to enable LAN communications between LAN devices and wherein each communication device in cooperation with its respective computer is configured to assign at least one virtual connection for each LAN connected computer to enable any LAN connected computer to route wide area network (WAN) data traffic across the LAN.

20. The method of claim 19, wherein a master computer is selected from the local area network (LAN) connected computers using at least one initialization algorithm.

21. The method of claim 20, wherein at least one slave computer is configured to reconfigure the local area network (LAN) upon detecting a master computer failure.

22. The method of claim 20, wherein the master computer applies a set of rules derived from a group of parameters consisting of access, traffic rates, and time-of-day when assigning the at least one virtual connection to each of the local area network (LAN) connected computers.

23. The method of claim 13, wherein the bi-directional local area network (LAN) to wide area network (WAN) data transfers are completed via a community antenna television (CATV) network link.

24. The method of claim 13, wherein the bi-directional local area network (LAN) to wide area network (WAN) data transfers are completed via a wireless network link.

25. The method of claim 13, wherein the wide area network (WAN) is the Internet.

26. The method of claim 13, wherein the wide area network (WAN) is a private network.

27. The method of claim 13, wherein the master computer assigns at least one asynchronous transfer mode virtual connection (ATM VC) to each computer in communication with the local area network (LAN), further comprising:
   notifying each computer on the LAN of the assigned ATM VC identifier; and
   using each computer to selectively recognize and remove the downstream data transfer
   designated from the network wherein downstream data transfers designated for slave computers are not processed by the master computer.

28. A local area network (LAN) to wide area network (WAN) communication system comprising:
   means to complete a first communication link between a master computer and the WAN;
   means to communicate between the master computer and each remaining device integrated on the LAN and assign at least one virtual connection to each integrated device on the LAN;
   means to identify and forward LAN to WAN data transfers via the first communication link; and
   means to selectively receive WAN to LAN data transfers at each device integrated on the LAN.

29. The communication system of claim 28, wherein the means to complete a first communication link is selected from the group consisting of a cable modem, a radio-frequency (RF) compatible converter, a digital subscriber line modem, and a computer modem.

30. The communication system of claim 28, wherein the means to communicate between the master computer and each remaining device integrated on the local area network (LAN) is accomplished with a data controller coupled to a respective computer, the data controller configured to send and receive LAN data traffic, the data controller further configured to translate LAN data traffic from a format suitable for transmission over a LAN to a format suitable for transmission over a wide area network (WAN), the data controller further configured to perform the reverse WAN to LAN data traffic translation.

31. The communication system of claim 28, wherein the means to accomplish both local area network (LAN) to wide area network (WAN) data transfers is accomplished via an asynchronous transfer mode (ATM) protocol.

32. The communication system of claim 31, wherein the asynchronous transfer mode (ATM) protocol uses an assigned virtual connection to accomplish data transfers to local area network (LAN) connected devices.

33. The communication system of claim 31, wherein the asynchronous transfer mode (ATM) protocol uses the combination of a terminal control protocol (TCP) and an Internet protocol (IP) address to identify a destination device on the wide area network (WAN).

* * * * *